Jan. 8, 1963  J. W. BACH  3,072,052
AUTOMATIC FEEDING APPARATUS
Filed April 27, 1960  9 Sheets-Sheet 1
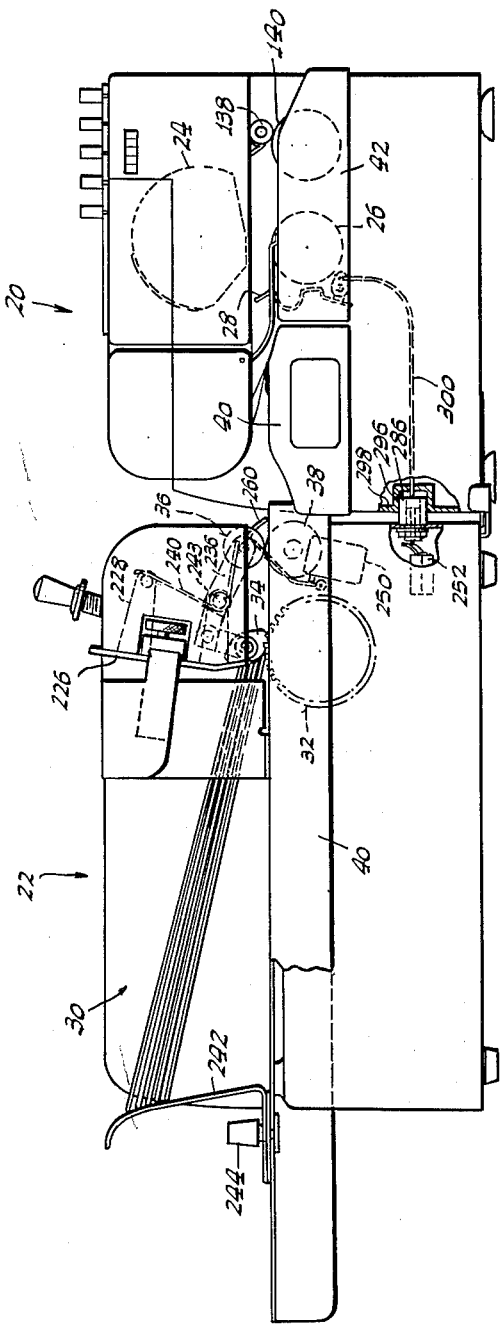
INVENTOR.
JOHN WILLIAM BACH
BY
William W. Jolton, Jr.
ATTORNEY

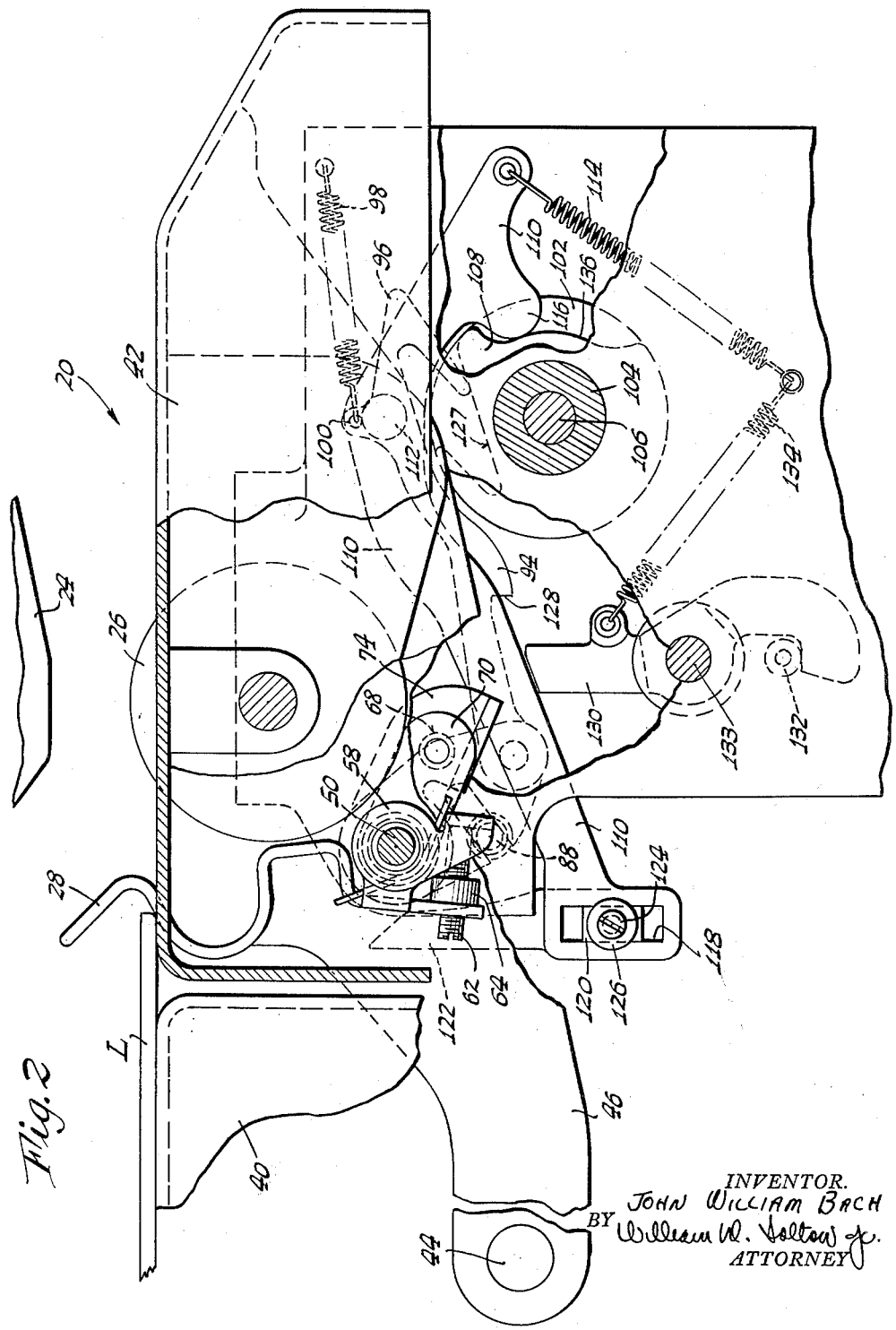

Jan. 8, 1963 J. W. BACH 3,072,052
AUTOMATIC FEEDING APPARATUS
Filed April 27, 1960 9 Sheets-Sheet 3
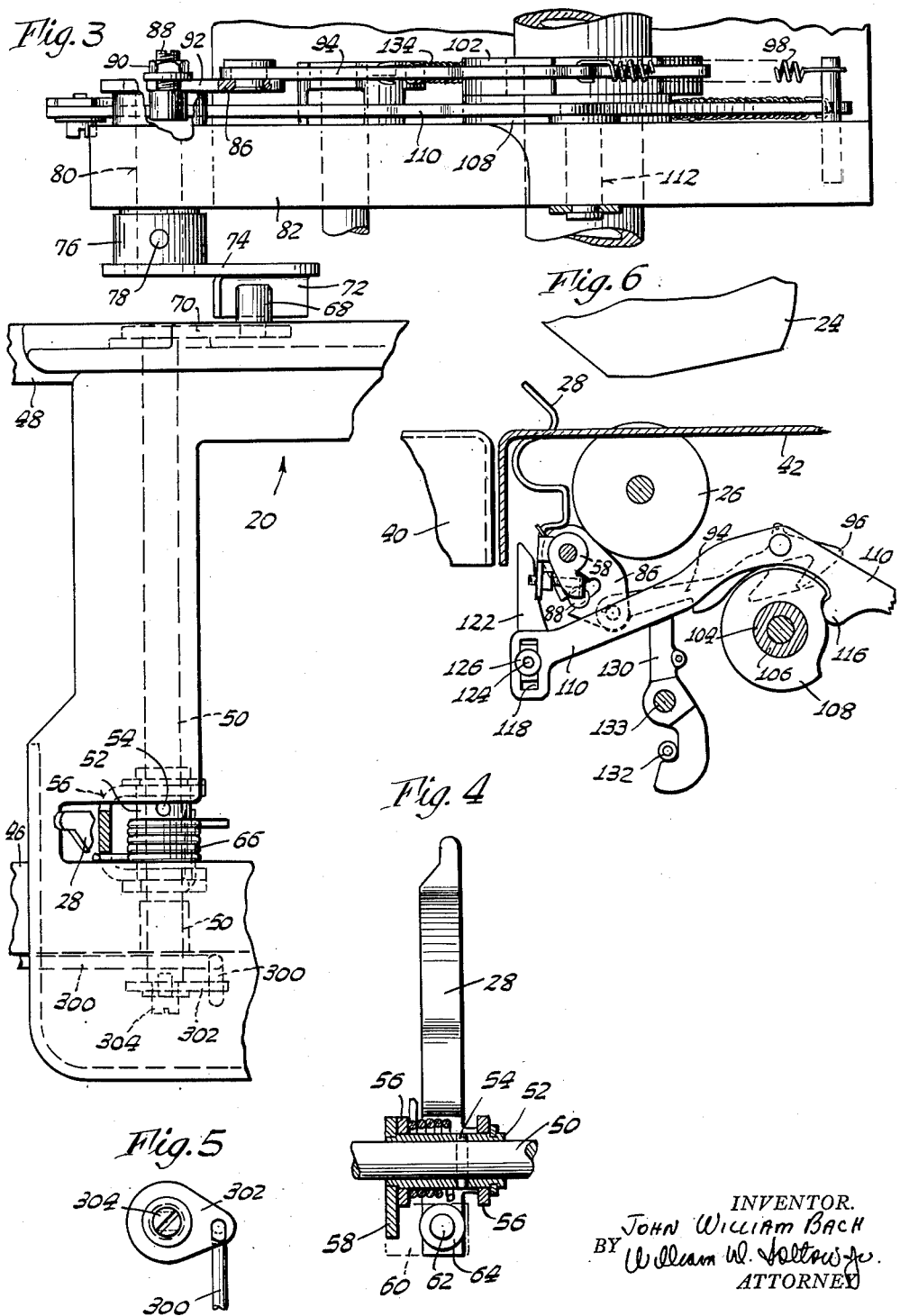
INVENTOR.
JOHN WILLIAM BACH
BY
ATTORNEY

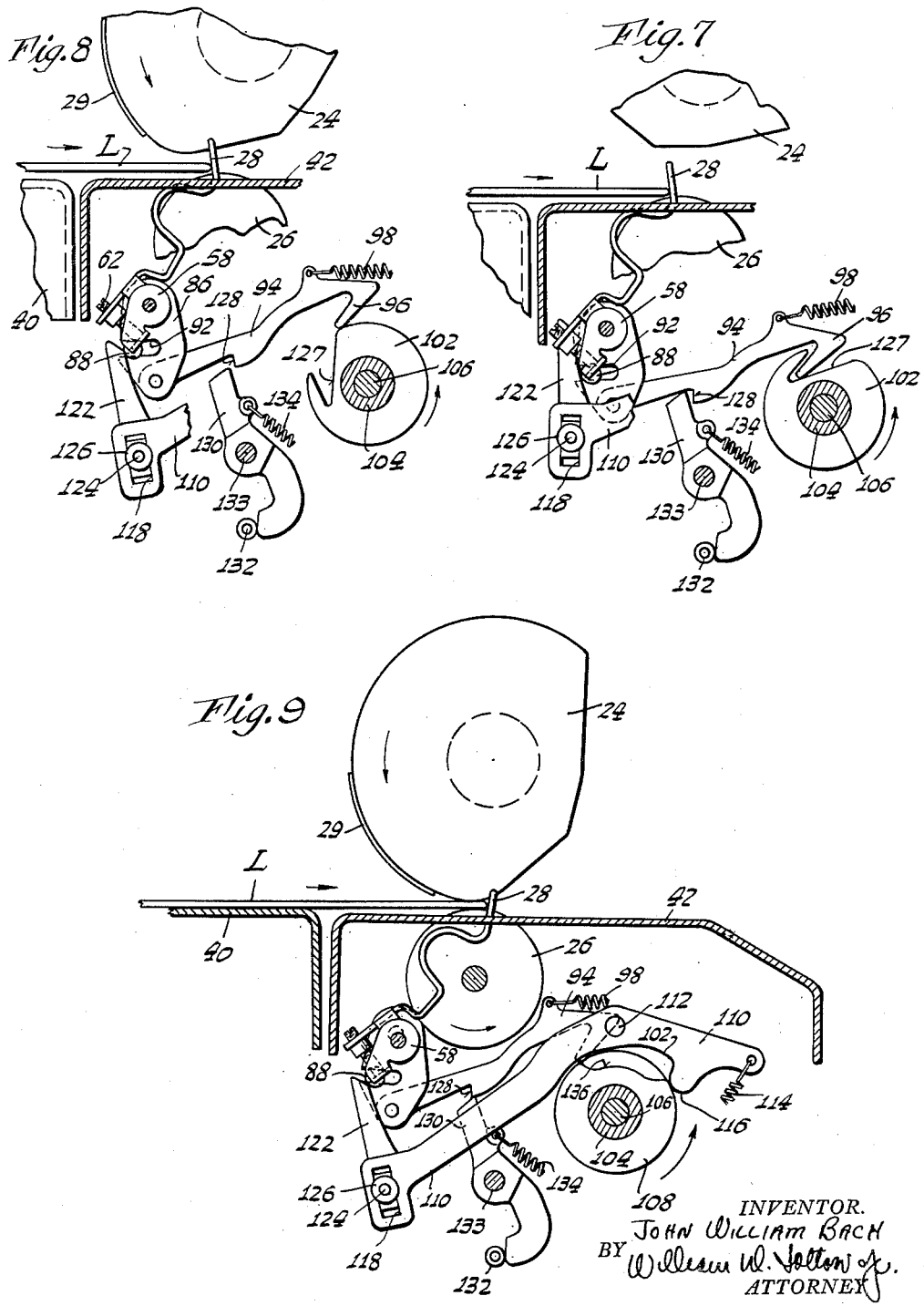

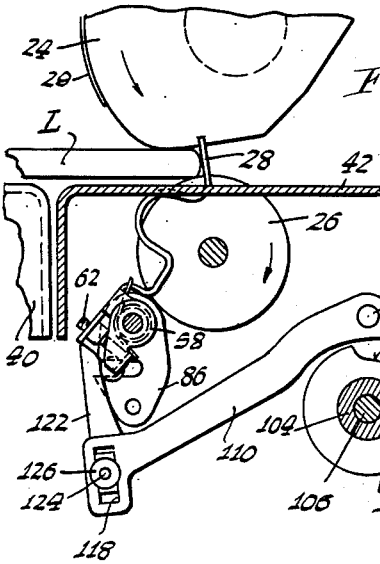
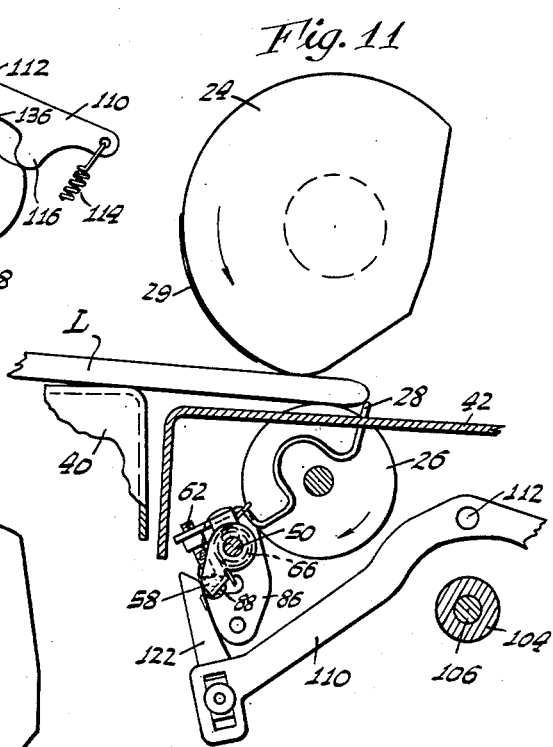
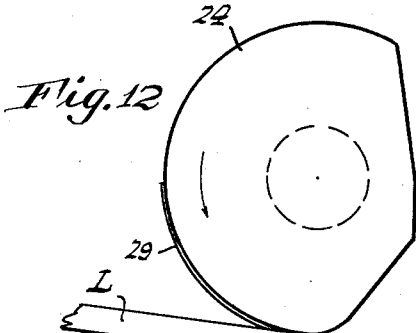
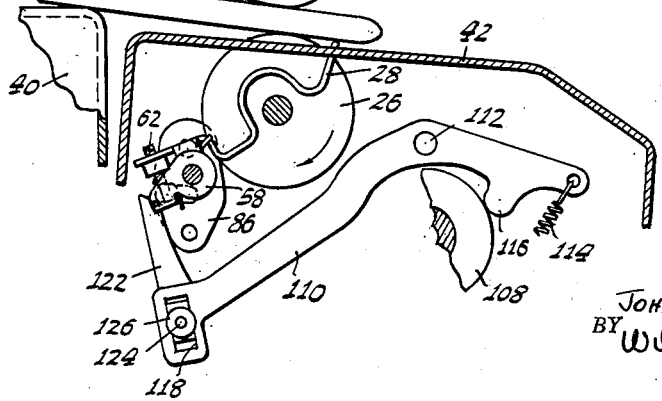

Jan. 8, 1963  J. W. BACH  3,072,052
AUTOMATIC FEEDING APPARATUS
Filed April 27, 1960  9 Sheets-Sheet 6
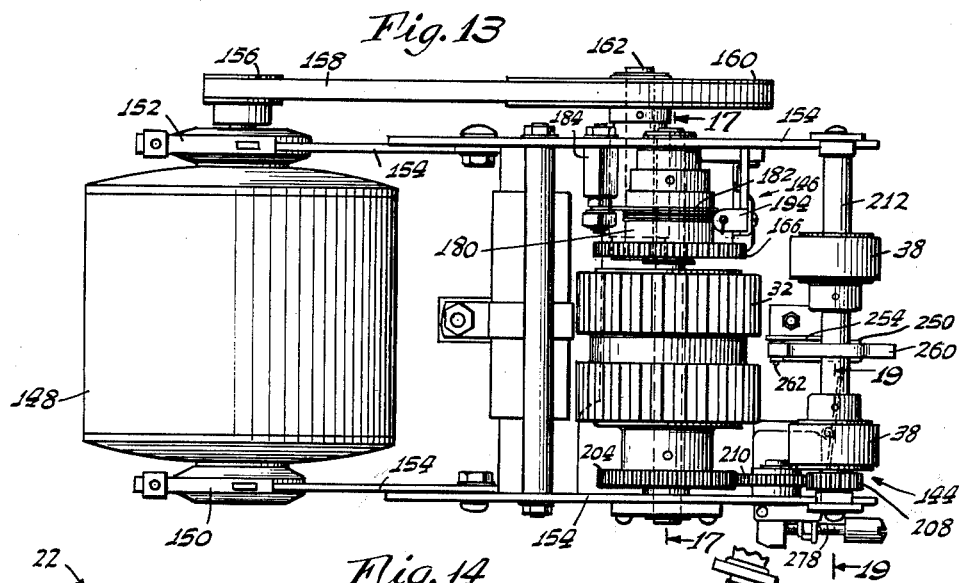
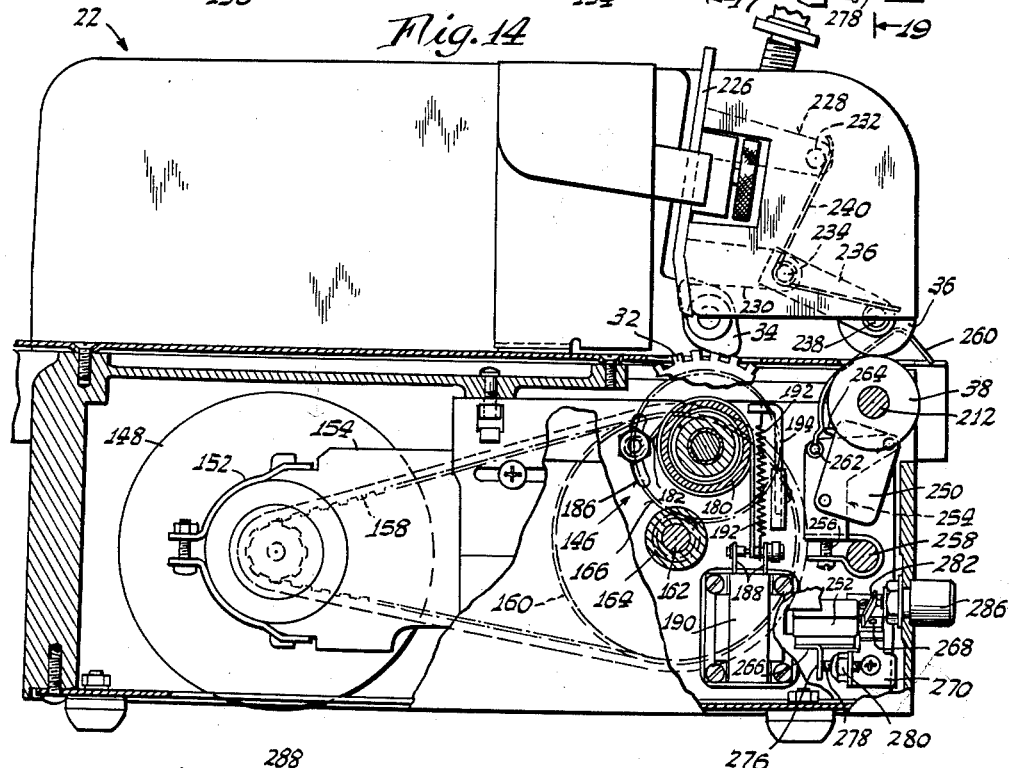
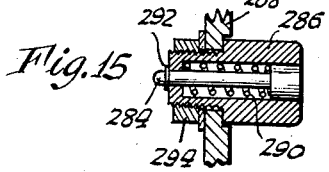
INVENTOR.
JOHN WILLIAM BACH
BY William W. Jalton Jr.
ATT'Y.

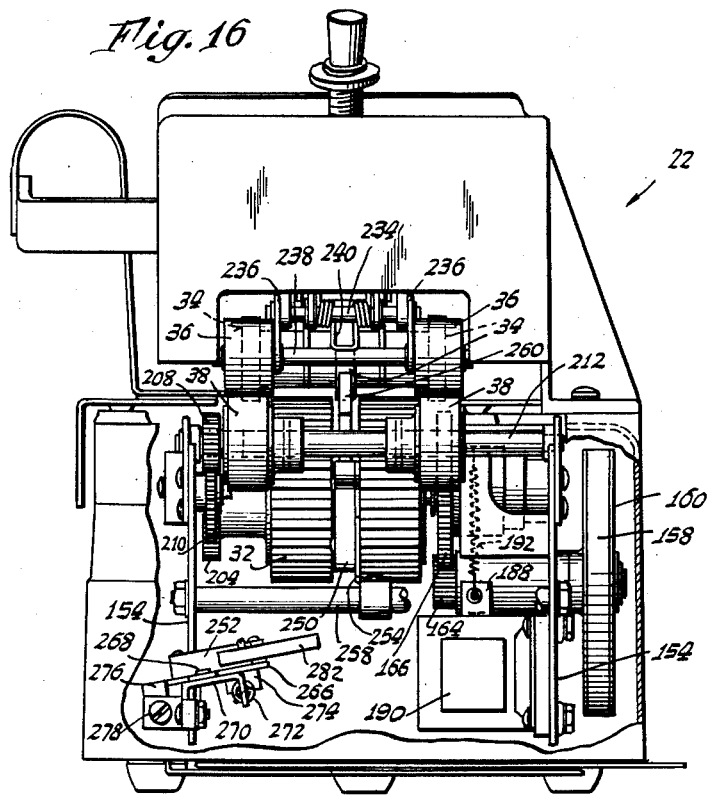
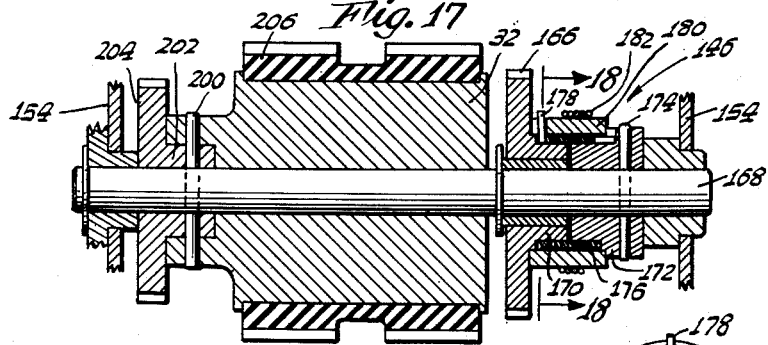
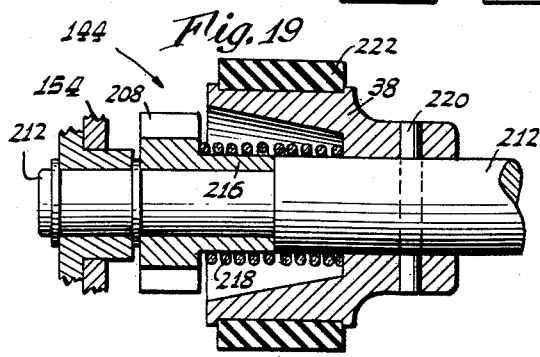
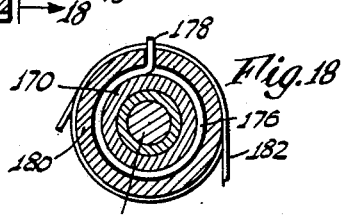

Jan. 8, 1963  J. W. BACH  3,072,052
AUTOMATIC FEEDING APPARATUS
Filed April 27, 1960  9 Sheets-Sheet 8
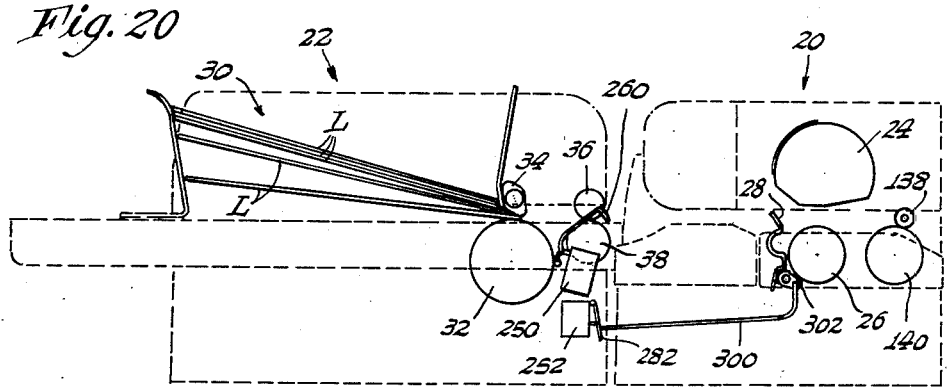
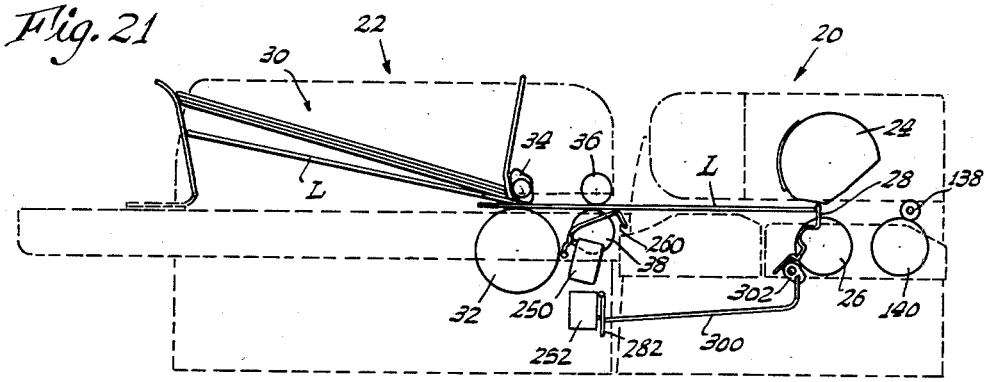
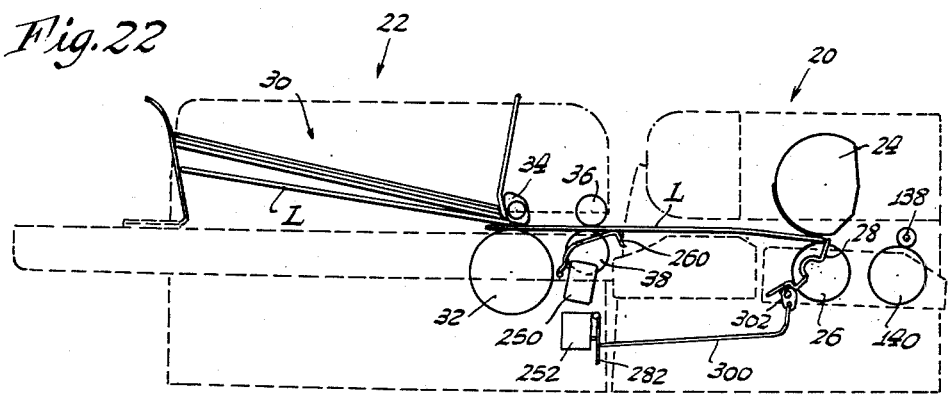
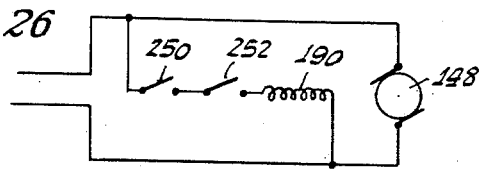
INVENTOR.
JOHN WILLIAM BACH
BY William W. Jolton Jr.
ATT'Y.

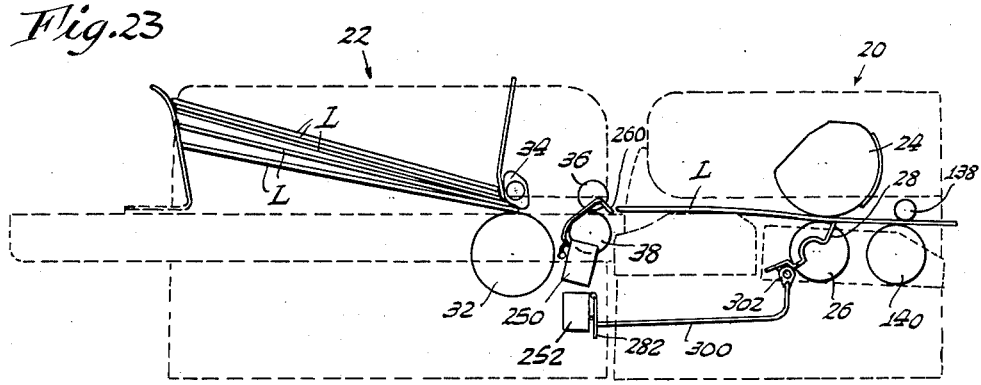
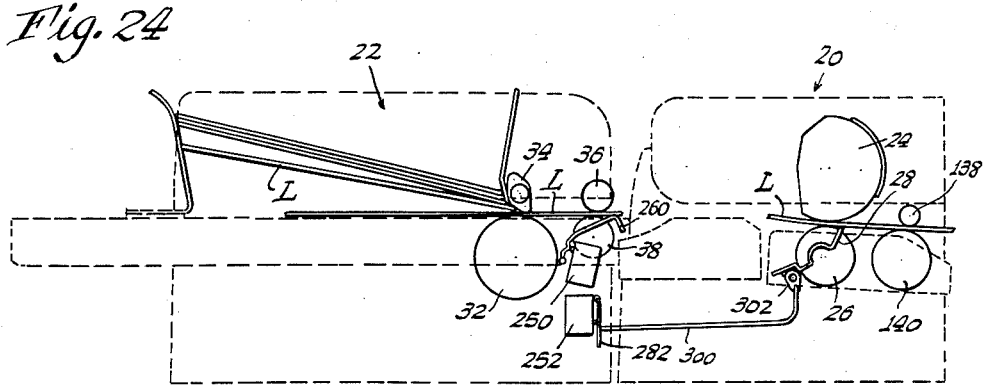
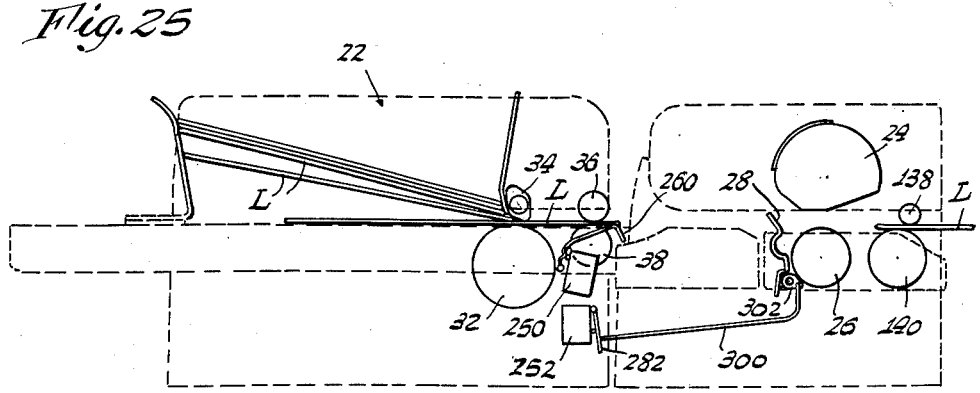

United States Patent Office
3,072,052
Patented Jan. 8, 1963

3,072,052
AUTOMATIC FEEDING APPARATUS
John William Bach, Stamford, Conn., assignor to Pitney-Bowes, Inc., Stamford, Conn., a corporation of Delaware
Filed Apr. 27, 1960, Ser. No. 25,041
9 Claims. (Cl. 101—235)

This invention relates to an automatic document-feeding apparatus including a single-cycle feeding unit and a supply feeding unit.

According to the embodiment of the invention as particularly disclosed herein, the single cycle feeding unit comprises means for printing an impression on and forwardly feeding a document each time a document is presented thereto. This single cycle feeding and printing unit is capable of being supplied with documents by hand in one-by-one succession. The supply feeding unit is in the form of an attachment which, in combination with the single cycle feeding and printing unit, provides an apparatus for automatically feeding documents in one-by-one succession from a stack and for printing an impression on each of the documents.

A number of problems arise in providing such a combination, among them being those of achieving registration of the printed impression with respect to each document, of providing for the feeding of documents of variable lengths and variable thicknesses without complicated adjustments of the apparatus, and of effecting efficient and rapid feeding and printing of the documents.

In achieving registration of the printed impression with respect to each of the documents, the single cycle feeding and printing unit includes means for stopping the forward movement of each document supplied thereto at a registered position relative to the printing means before the latter begins each document printing and feeding cycle. The apparatus is provided with control means whereby feeding of a document against or into overlapping relation to a preceding document stopped at the registered position, is automatically prevented while efficient and rapid operation is achieved. This is accomplished by the automatic feeding and printing apparatus of the invention for a substantial range of document lengths and thicknesses without special adjustments of the control means.

Accordingly, an object of this invention is to provide a novel apparatus for printing and feeding documents.

A further object is the provision of such an apparatus having control means capable of accommodating a substantial range of document lengths and thicknesses without special adjustments of the control means.

A further object of the invention is to provide such an apparatus which is automatic in operation, inexpensive, dependable and capable of handling a large number of documents per unit time interval.

Further objects and advantages will become apparent as the description proceeds.

An embodiment of the invention is shown in the accompanying drawings wherein:

FIG. 1 is a side elevational view of an automatic document-feeding and printing apparatus including a single cycle feeding and printing unit and a supply feeding unit according to the invention;

FIG. 2 is a fragmentary, side elevational view on an enlarged scale and partly in section of the printing and feeding means, along with control means therefor, of the single cycle feeding and printing unit included in FIG. 1;

FIG. 3 is a fragmentary, top plan view of said control means;

FIG. 4 is a rear elevational view partly in section and showing the yieldable connection between a trip finger and a shaft of said control means;

FIG. 5 is a side elevational view of a portion of a connecting link connected to a control lever, the latter also being mounted on said shaft;

FIGS. 6–9 are side elevational, operational views on a scale intermediate those of FIGS. 1 and 2, and showing parts of the printing and feeding means and control means therefor at different operational positions when a letter of ordinary or comparatively small thickness is being operated upon;

FIGS. 10–12 are views similar to FIGS. 6–9 but depicting the feeding and printing of a letter of comparatively large thickness;

FIG. 13 is a top plan view of the supply feeding unit with the casing and other parts removed;

FIG. 14 is a side elevational view of the supply feeding unit with portions of the casing and other parts broken away;

FIG. 15 is a side elevational, sectional view of a plunger unit supported by the frame of the supply feeding unit;

FIG. 16 is a front elevational view of the supply feeding unit with a portion of the casing broken away;

FIG. 17 is a sectional view of the separator roller and the main drive clutch of the supply feeding unit, this view being taken along line 17—17 of FIG. 13;

FIG. 18 is a sectional view taken along line 18—18 of FIG. 17;

FIG. 19 is a sectional view of one of the take-away feed rollers and the overriding drive clutch therefor of the supply feeding unit, this view being taken along line 19—19 of FIG. 13;

FIG. 20–25 are more or less diagrammatic views of the supply feeding unit and the single cycle feeding and printing unit, these views depicting the operation of the automatic feeding and printing apparatus of the invention; and FIG. 26 is a schematic wiring diagram of the electrical system of the supply feeding unit.

*General Description*

Referring to FIG. 1, the automatic feeding and printing apparatus as shown in the drawings, includes two separable units; one of these being a postage metering machine generally designated at 20 and the other being a supply unit generally designated by the reference numeral 22.

The postage metering machine 20 is operable to print a postage stamp impression of a respective selected value on each letter supplied thereto. In this regard, the postage metering machine 20 is a single cycle feeding and printing unit for printing a postage stamp impression in registered position at the upper right hand corner of each letter supplied thereto. The postage metering machine 20 includes a rotary feeding and printing drum or roller 24 which cooperates with an opposed, feeding and impression roller 26. Printing drum 24 has its outer periphery relieved in part and is intermittently driven in the counterclockwise direction whereas impression roller 26 is continuously driven in the clockwise direction. When a letter is supplied to the drum 24 and roller 26, whether by hand or by the supply unit 22, the leading edge of that letter moves a trip finger 28 forwardly (to the right as viewed in FIG. 1) from an initial position to a letter stop position whereupon the letter is stopped in a registered position relative to drum 24 and roller 26, and rotation of drum 24 starts. Trip finger 28 is then released to permit forward feeding of the letter. Drum 24 drivably engages the letter to forwardly feed it, and a printing die 29 on the drum 24 effects the printing of a postage stamp impression in registered position on the letter, all in cooperation with impression roller 26.

By combining the supply unit 22 with the single cycle postage printing unit 20, an automatic feeding and postage printing apparatus is provided. The supply unit 22 includes a hopper generally designated at 30 into which a stack of letters is placed as indicated in FIG. 1. Supply unit 22 further includes a separator feed roller 32 cooperable with opposed separator stones 34 to separate the lowermost letter of the stack from the remaining letters and to feed that letter forwardly to the bite between opposed take-away feed rollers 36 and 38, respectively. Rollers 36 are idler feed rollers resiliently biased toward rollers 38 which are driven feed rollers. Control means are provided, as will later be described in detail, whereby letters are automatically fed in one-by-one sequence from the supply unit 22 to the postage printing and feeding unit 20 until the stack of letters in the hopper 30 is depleted.

Detailed Description

Referring to FIGS. 1–5, the single cycle postage metering unit 20 includes a feed deck provided by the upper surface of a fixedly supported member 40 and by the upper surface of a yieldable member 42 which is supported for pivotal movement about a shaft 44 by a pair of legs 46 and 48 integral with the member 42. Shaft 44 is fixedly supported by the framework of unit 20, and member 42 is yieldably biased upwardly about shaft 44 by spring means not shown.

A shaft 50 is rockably supported by member 42 and, with reference to FIGS. 2–4, has a hub 52 secured thereto by a pin 54. The trip finger 28 is integral with a yoke 56 which mounts the trip finger for pivotal movement about the hub 52. A generally L-shaped member 58 is secured to the hub 52, the distal leg 60 of which normally abuts the end of a screw 62 adjustably secured to the lower end of the trip finger 28 by a jam nut 64. A torsion spring 66 is disposed about the hub 52. One end of the spring 66 engages the upper surface of the yoke 56 and the other end of this spring engages the upper surface of the distal leg 60 of L-shaped member 58 thereby yieldably biasing the leg 60 and the adjacent end of the screw 62 against each other.

When a letter is supplied to the unit 20 for printing and feeding, the leading edge of the letter engages the upper end of the trip finger 28 and pivots the trip finger forwardly thereby to rock the shaft 50 to move the lower arm 68 of a crank 70 carried at one end of the shaft 50 against the lower arm 72 of a crank 74. The hub 76 of crank 74 is pinned at 78 to one end of a shaft 80. Shaft 80 is journalled in a frame member 82 of the unit 20, and the hub 84 of a lever 86 is pinned to the opposite end of this shaft.

A headed stop screw 88 is secured by a nut 90 in adjusted position along a slot 92 provided by lever 86. Pivotally connected at the lower end of lever 86 is a link 94 having a hook-shaped end 96. One end of a light tension spring 98 is secured to the framework of the unit 20, and the other end is connected to link 94 at 100 whereby the free end of link 94 is resiliently biased to the right and downwardly (as viewed in FIGS. 2 and 6–9) against a cam 102 secured to a hollow shaft 104. Hollow shaft 104 is driven by a one-revolution clutch. Hollow shaft 104 therefore rotates one revolution in the counterclockwise direction (as viewed in each of FIGS. 2 and 6–9) each time the one-revolution clutch is engaged. The one-revolution clutch has a continuously driving shaft 106 about which hollow shaft 104 rotates.

Also secured to hollow, one-revolution shaft 104 is another cam 108 which cooperates with a cam-following lever 110. Cam following lever 110 is pivotable about the axis of a pin 112 journalled by frame member 82. One end of lever 110 is connected to one end of a tension spring 114; the other end of the latter being connected to the framework of the unit 20 whereby lever 110 is resiliently biased in the clockwise direction (as viewed in FIGS. 2 and 6–9) to maintain a cam following mode 116 of lever 110 in engagement with the peripheral surface of the cam 108. The opposite end of lever 110 provides a slot 118 along which a boss 120 integral with a stop member 122 is adjustably secured by a headed screw 124 tightened in threaded engagement with the boss 120. When the screw 124 is so tightened, the head thereof tightens a washer 126 against the adjacent surface of the lever 110. In this manner, adjustment of stop member 122 is effected relative to the adjacent end of lever 110 and in the direction of slot 118.

With the respective parts in the positions shown in FIGS. 2, 3 and 6, a letter L to be fed and imprinted with a postage stamp impression is moved against trip finger 28 to pivot the latter along with shafts 50 and 80 and lever 86 in the clockwise direction (as viewed in FIG. 2) until stop screw 88 engages stop member 122, at which point the trip finger 28 and the letter L are stopped with the letter in registered position relative to the printing die 29 of the printing drum 24. During the clockwise movement of lever 86, link 94 is pulled from the position of FIGS. 2 and 6 to that of FIG. 7 whereby the end of hook 96 rides on a relieved portion 127 of cam 102, and a shoulder 128 provided by the link 94 trips a dog 130 to release a downwardly biased latch member 132 for movement to the downward position of FIG. 7. Dog 130 is resiliently biased in the clockwise direction about a pin 133 by a tension spring 134. Latch member 132 temporarily remains in its downward position and thereby retains dog 130 in its tripped position. Latch member 132, when released to its downward position, effects engagement of the above-mentioned one-revolution clutch whereby shaft 104, printing drum 24 and cams 102 and 108 begin their one revolution of counterclockwise movement. It is to be noted at this point that since latch member 132 is released before stop screw 88 engages stop member 122, trip finger 28 will reach its tripped position (whereupon feeding and printing drum 24 starts to rotate) slightly before reaching its letter-stopping position (at which the letter is stopped in registration with the drum 24 and printing die 29). When the parts reach the respective positions shown in FIG. 8, cam 102 will have elevated link 94 sufficiently to clear shoulder 128 from the adjacent end of dog 130, and the driving portion of the periphery of printing and feeding drum 24 will have closely approached the upper surface of letter L.

As the parts move from the respective positions shown in FIG. 7 to those shown in FIG. 8, node 116 of lever 110 leaves a relieved portion 136 of the periphery of cam 108 and rides on the circular portion of the periphery of this cam whereby lever 110 is pivoted in the counterclockwise direction to retract stop member 122 from blocking relation with the head of stop screw 88. Just before the parts reach the respective positions as shown in FIG. 9, stop member 122 will have reached its fully retracted position whereby trip finger 28 will be free for further clockwise pivotal movement past its stop position. With the parts at their respective positions as shown in FIG. 9, the circular periphery of drum 24 has just come into driving engagement with letter L whereupon the letter is fed against trip finger 28 to pivot the latter downwardly out of the feeding path of the letter. Drum 24 and printing die 29 cooperate with impression roller 26 to print a postage stamp impression in registered position on the letter while feeding the letter forwardly therefrom. The letter can be fed outside the confines of the unit 20 under the momentum gained from drum 24 and impression roller 26, or a pair of continuously rotating take-away rollers 138, 140 drivably connected to shaft 106 may be provided.

As the drum 24 approaches and reaches the end of its one-revolution movement, the trailing end of the letter L will have cleared the upper end of trip finger 28 whereby the latter returns to the initial position of FIGS. 2 and 6 under the bias of spring 98. The end of hook 96 of link 94 will come to rest on relieved portion 127 of cam 102 as shown in FIGS. 2 and 6 whereby shoulder 128 will be in position to trip dog 130 during the next printing and feeding cycle of the unit 20. Also, node 116 of lever 110 will lie in engagement with the relieved portion 136 of cam 108 as shown in FIGS. 2 and 6 whereby stop member 122 is disposed in the path of stop screw 88 to stop trip finger 28 and the next letter supplied to the unit 20 at the registered position. Latch member 132 will have been elevated whereby dog 130 will have pivoted under the bias of spring 134 back to latching position with respect to latch member 132.

For the details of latch member 132, the above-mentioned one-revolution clutch and the remaining associated structure of the drive means for the postage metering machine 20, reference may be had to U.S. Patent No. 2,934,009 granted on April 26, 1960 to J. W. Bach et al.

Means are provided whereby a wide range of letter thicknesses are accommodated by the apparatus of the instant invention without special adjustments each time the letter thickness changes. In this regard, it will be apparent that if trip finger 28 were to be released from the registered stop position (as shown in FIG. 7) any earlier than just an instant before the circular portion of the periphery of drum 24 comes into driving engagement with a letter at the registered stop position, any slight forward urging of the letter by the means supplying the letter to the unit 20, will not be resisted and misregistration of the postage stamp impression relative to the letter will result. The point in the operating cycle at which trip finger 28 is released from the stop position can be finely adjusted by adjustably setting the lower end of stop member 122 along and in the direction of the slot 118 at one end of the lever 110. This adjusts the point at which the upper end of stop member 122 moves out of blocking relation to stop screw 88 whereby trip finger 28 will be released an instant before forward feeding of the letter L from the registered position. A difficulty lies, however, in the obvious fact that the thicker the letter is, the earlier in the cycle will occur the point at which the circular portion of the periphery of drum 24 comes into driving engagement with the letter. To accommodate this difficulty, the adjustment of the stop member 122 relative to the lever 110 is set so that thinner letters will be forwardly fed just an instant after trip finger 28 is released from the stop position. Thicker letters would therefore ordinarily be jammed at their leading edges against the trip finger 28 because the latter would not be released from the stop position before forward feeding of the thicker letters started. The above-described torsion spring connection between the trip finger 28 and shaft 50 accommodates this, however, in that torsion spring 66 yields permitting forward pivotal movement of trip finger 28 relative to shaft 50. The result is that a comparatively thick letter will move the trip finger 28, against the bias of spring 66, slightly past the stop position until release of the trip finger occurs. Thicker letters, being inherently more rigid than thinner letters, are capable of deflecting torsion spring 66 without substantial buckling of the leading edges of the letters.

Referring to FIGS. 10–12, operation of the trip mechanism is depicted with a comparatively thick letter L. It will be apparent from FIG. 10 that the circular portion of the periphery of drum 24 comes into driving engagement with thick letter L earlier than it would with a substantially thinner letter. In FIG. 11, it will be seen that forward feeding of the letter past the stopped registered position has occurred before stop member 122 has moved out of blocking relation to stop screw 88. However, and as also depicted in FIG. 11, torsion spring 66 has yielded permitting forward pivotal movement of trip finger 28 relative to shaft 50 which is being held against rotation by the blocking engagement of stop member 122 with stop screw 88, whereby the end of screw 72 moves away from engagement with the leg 60 of L-shaped member 58. The result is that a very slight, and practically insignificant, misregistration of the postage stamp impression occurs relative to the thicker letter L. More importantly, no special adjustments are required to accommodate significant changes in the thickness of the letters being printed and fed, and this is achieved without undue buckling and consequent damage to the leading edges of any of the letters. FIG. 12 shows the parts at their respective positions just after the trip finger 28 has been released whereby the end of screw 62 again engages the leg 60 of L-shaped member 58 so that trip finger 28 and shaft 50 subsequently move in unison with each other.

By adjusting the position of stop screw 88 along the slot 92 provided by lever 86, adjustment is effected of the amount of pivotal movement of trip finger 28 between the point at which the shoulder 128 of link 94 trips dog 130 to engage the one-revolution clutch and the point at which stop screw 88 engages stop member 122 to stop trip finger 28 in the registered position. By adjusting screw 62 relative to jam nut 64 at the lower end of trip finger 28, the initial pivotal position of trip finger 28 relative to shaft 50 is adjusted thereby adjusting the margin between the postage stamp impression and the leading edge of each letter.

With reference to FIGS. 1 and 13–19, the take-away feed rollers 38 of the supply feeding unit 22 are driven through an overriding clutch generally designated at 144, and the latter is driven off the drive for separator feed roller 32. Separator feed roller 32 is, in turn, driven through an overriding, main drive clutch generally designated at 146; the latter being driven by a continuously running electric motor 148. Motor 148 is supported at 150 and 152 by the frame 154 of the supply feeding unit 22. The shaft of continuously running motor 148 fixedly carries a pulley wheel 156 for driving a belt 158, and belt 158 drives a pulley wheel 160 secured to one end of a shaft 162. Shaft 162 is bearinged by the frame 154 and fixedly carries a gear 164 at its other end. Gear 164 meshes with and continuously drives a gear 166. Referring particularly to FIGS. 17 and 18 as well as to FIGS. 13, 14 and 16, continuously driven gear 166 is freely rotatable about a shaft 168, the latter being bearinged by the frame 154. Gear 166 forms a portion of the driving part of overriding clutch 146 and has an integral hub 170. Alongside hub 170 is a second hub 172 pinned at 174 to shaft 168. Hub 172 forms a portion of the driven part of clutch 146. A coil spring 176 extends from a protruding end 178 into snugly wrapped relation about hubs 170, 172 in the direction such that clockwise rotation of gear 166 and hub 170 (as viewed in FIG. 14) tightens the coils of spring 176 about hubs 170 and 172 to drive the latter and shaft 168 in the clockwise direction.

A de-clutching collar 180 is loosely fitted about coil spring 176 and provides a recess to receive the protruding end of this spring. Collar 180 rotates with hubs 170, 172 except when stopped from rotating by a de-clutching brake now to be described. Referring to FIGS. 13, 14, 17 and 18, this brake includes a wire 182 having one end secured to a post 184, the latter being lockably adjusted along a slot 186 provided by frame 154. Wire 182 is wrapped loosely about collar 180 and is connected at its opposite end to a plunger 188 operated by a solenoid 190. When solenoid 190 is energized, plunger 188 is moved downwardly (as viewed in FIG. 14) thereby tightening wire 182 about collar 180 and braking the latter to a stop. When collar 180 is so stopped, the protruding end 178 of rotating coil spring 176 strikes the forward end of the recess provided by collar 180 thereby loosening the turns of coil spring 176 about hub 170 whereby the latter and gear 166 are de-clutched from hub 172. Gear 166 and integral hub 170 continue to rotate, of course, while hub 172, shaft 168 and collar 180 remain stopped. When solenoid 190 is de-energized, plunger 188 returns to its upward position under the bias of a return spring 192. Return spring 192 is connected at one end to plunger 188 and at its other end to a vertically adjustable bracket 194 which is supported by frame 154. Accordingly, when solenoid 190 is energized, shaft 168 is de-clutched from continuously rotating gear 166; and when solenoid 190 is de-energized, shaft 168 is clutched to gear 166.

It is to be noted that main drive clutch 146 also acts as an overriding clutch in that roller 32 (when viewed from the left-hand side of FIG. 17) can be rotated in the clockwise direction by an external force when the clutch 146 is de-clutched. In this regard, when braking wire 182 is tightened to de-clutch hub 172 and roller 32 from hub 170 and gear 166, a clockwise torque applied to roller 32 tends to loosen the turns of clutch spring 176 about hub 172 to permit clockwise rotation of roller 32.

Still referring in particular to FIG. 17 along with FIGS. 13, 14 and 16, the separator feed roller 32 is pinned at 200 to shaft 168 and to the integral hub 202 of gear 204. It will be noted at this point that separator feed roller 32 is covered by a rubber strip 206 ribbed about the outer surface thereof. Gear 204 rotates with roller 32 and shaft 168 to drive a gear 208 through an intermediate gear 210. Gear 208 is rotatably supported about a shaft 212 as best shown in FIG. 19, and intermediate gear 210 is rotatably supported by a stub shaft 214 carried by frame 154.

Referring particularly to FIG. 19 along with FIGS. 13, 14 and 16, gear 208 has an integral hub 216 disposed about a reduced-diameter portion of the shaft 212. A coil spring 218 is snugly wound about hub 216 and shaft 212 in the direction such that rotation of gear 208 in the clockwise direction (when viewed from the left hand side of FIG. 19) tightens the spring 218 about both hub 216 and shaft 212 to clutch these latter two parts together. Take-away rollers 38 are pinned at 220 to shaft 212 and rotate with this shaft. It is to be noted that this clutching arrangement 144 permits take-away rollers 38 to be rotated in the clockwise direction (as viewed in FIG. 14 and from the left hand side of FIG. 19) while gear 208 remains stationary. That is, if gear 208 should be stationary because shaft 168 of main driving clutch 146 is de-clutched from gear 166, such clockwise rotation of take-away rollers 38 would act to loosen the turns of coil spring 218 about the shaft 212 of overriding clutch 144 thereby permitting overriding of take-away rollers 38 relative to the gear 208. At this point it will be noted that, as best shown in FIG. 19, take-away rollers 38 have a rubber, friction-surfaced cover 222.

The separator feed roller 32 cooperates with three spaced separator stones 34 to separate the lowermost one of a stack of letters disposed in hopper 30 from the stack and to forwardly feed that letter into the bite between take-away rollers 36, 38. As can best be seen in FIG. 16, the two ribbed sections of separator feed roller 32 are in opposed alternating relation to the three separator stones 34. Separator stones 34 are formed of an abrasive material. For details of the operation of and supporting structure for these separator stones, reference may be had to U.S. Patent No. 2,635,874, granted on April 21, 1953 to W. T. La Bore.

The front wall 226 of hopper 30 fixedly supports an upper pair of brackets 228 and a lower pair of brackets 230. A transverse rod 232 is supported by brackets 228, and a shaft 234 is supported by brackets 230. Shaft 234 pivotally supports a pair of spaced arms 236 which, in turn, support an idler shaft 238. Idler take-away rollers 36 are rotatably supported by idler shaft 238. A torsion spring 240 is coiled about shaft 234, has one end biased against rod 232, and has its other end biased against shaft 238 whereby idler take-away rollers 36 are resiliently urged against driven take-away feed rollers 36.

The rear wall 242 of hopper 30 is lockably secured in adjusted relation toward and away from front wall 226 by a thumb screw 244 in a conventional manner, thereby to accommodate letters of varying lengths.

Control means are provided for coordinating the operations of the printing and feeding unit 20 and supply feeding unit 22 whereby these two units combine to provide an automatic apparatus for feeding and printing letters in one-by-one sequence. Referring to the schematic wiring diagram of FIG. 26, this control means includes, in addition to solenoid 190, two electrical switches 250 and 252, respectively. As shown in FIG. 26, switches 250 and 252 are connected in series with solenoid 190 and with each other; this series-connected current flow path being disposed in parallel connection with motor 148. Accordingly, motor 148 runs continuously, so long as its terminals are electrically connected across the supply line, to continuously drive the driving part of main clutch 146. As described above, the driven part of main clutch 146 will be driven by the driving part thereof until declutched from the driving part when solenoid 190 is energized. It will be clear then that feed rollers 32 and 38 of supply feed unit 22 are continuously driven except when solenoid 190 is energized to stop rollers 32 and 38, and both of switches 250 and 252 must be closed to energize solenoid 190. Printing and feeding drum 24 of unit 20 is driven, as described above, through a one-revolution printing and feeding cycle which starts when a letter is fed against trip finger 28 to move the latter past its trip position to its stop position. Drum 24 and printing die 29 cooperate, during each cycle, with continuously driven impression roller 26 to print an impression on a letter and to feed the letter forwardly just after trip finger 28 has been released for forward movement to non-blocking position with respect to the letter. As also noted above, a pair of continuously driven take-away rollers 138, 140 may be provided or not, to eject the imprinted letter from the unit 20. When rotatably driven, rollers 138, 140 rotate at a peripheral speed slightly faster than that at which drum 24 and impression roller 26 are rotated, drum 24 and roller 26 rotate at a peripheral speed slightly faster than that at which take-away rollers 36, 38 of unit 22 are rotated, and the latter set of rollers rotate at a peripheral speed slightly faster than that of separator roller 32.

As best shown in FIGS. 1, 13, 14 and 16, the electrical switch 250, as schematically depicted in FIG. 26, is supported by a bracket 254. Bracket 254 is secured by a screw 256 in pivotally adjusted position about a reinforcing rod 258 which is connected at its ends to frame members 154, 154. A trip finger 260 is pivoted about a pin 262 carried by bracket 254. Trip finger 260 lies across the feed path of letters fed by the supply feed unit 22. When a letter is forwardly fed by supply feed unit 22, it will deflect trip finger 260 about pin 262 from an initial position to a tripped position to depress an actuating member 264 of the switch 250 whereby the latter is actuated to closed condition. It will be apparent that the point at which switch 250 is tripped will be adjusted by adjusting bracket 254 pivotally about rod 258. Trip finger 260 is yieldably biased by spring means (not shown) in the counterclockwise direction (as viewed in FIG. 14) from its tripped position to the initial position as shown in FIG. 14.

As best shown in FIGS. 1, 13, 14 and 16, the electrical switch 252, schematically depicted in FIG. 26, is disposed below the level of switch 250. Switch 252 is carried by a bracket 266 which is mounted for substantially horizontal pivotal adjustment about a pin 268 carried by a second bracket 270. Bracket 270 is fixedly secured to one of frame members 154 and mounts a compression spring 272 (FIG. 16) which bears against a projection 274 of bracket 266 to bias another projection 276 of this bracket against the end of an adjusting screw 278. Screw 278 is threadedly received by a portion of bracket 270 and is locked in adjusted position by a lock nut 280. It will be apparent that by adjustment of screw 278, the position of actuating member 282 for switch 252 is adjusted toward and away from one end of a plunger 284 (FIGS. 14 and 15).

Referring particularly to FIG. 15, plunger 284 is supported by a plug 286 carried by a casing member 288 of the supply feeding unit 22. A compression spring 290 bears at one end against a shoulder provided by plunger 284 and at the other end against a shoulder provided by the plug 286. In this manner, spring 290 resiliently biases plunger 284 to the right (as viewed in FIGS. 1, 14 and 15) to a stop position defined by engagement of a spring clip 292 with the adjacent outer end of plug 286. Plug 286 is secured to casing member 288 by tightening down a nut 294 in threaded engagement with the plug.

When feed units 20 and 22 are disposed in operative relation to each other as shown in FIG. 1 with the forward end of the latter next adjacent the rear end of the former, the protruding portion of plug 286 fits in a socket 296 provided by a casing member 298 of unit 20. Socket 296 provides an aperture within which rides one end of a connecting link 300. This one end of connecting link 300 is disposed adjacent one end of the plunger 284, and the other end thereof is pivotally connected to a control lever 302 (FIGS. 1, 3 and 5). Lever 302 is fixed on one end of the shaft 50 by means of a screw 304. As previously described, shaft 50 is rotated by trip finger 28 of unit 20 when this trip finger 28 is moved forwardly by a letter to the stop position shown in FIG. 7. As shaft 50 rotates, lever 302 moves link 300 to drive the end of this link against the plunger 284 which trips the actuating member 282 of switch 252. When actuating member 282 is so tripped, switch 252 will be actuated to closed condition. It is noted that by adjusting stop screw 278, the point during movement of connecting link 300 to the left (as viewed in FIG. 1) at which switch 252 is actuated to closed condition, will be correspondingly adjusted.

Referring again to FIG. 26, it will be clear from the above that switch 252 will be actuated to closed condition by movement of trip lever 28 of unit 20 to its letter-stopping position, and that switch 250 will be actuated to closed condition by movement of trip lever 260 of unit 22 to its tripped position. Only when both of switches 250 and 252 are closed will solenoid 190 be energized to stop the drive to separator feed roller 32 and take-away feed rollers 36, 38 of the unit 22. Further, by way of recapitulation, feeding and printing drum 24 of the unit 20 starts its one-revolution cycle of operation when trip finger 28 of this unit 20 moves past its tripping position.

Referring now to the schematic operational views of FIGS. 20-25, and particularly to FIG. 20 thereof, a stack of letters L is shown as being disposed in the hopper 30 of supply feeding unit 22. Upon connecting the parallel circuit of FIG. 26 across an electrical supply line as shown in this figure, separator feed roller 32 and take-away feed roller 38 of unit 22 start rotating. Separator feed roller 32, in cooperation with separator stones 34, separates the lowermost letter L of the stack from the remainder of the stack and feeds this letter to the bite of take-away feed rollers 36, 38. As indicated in FIG. 21, trip lever 260 of unit 22 is tripped to close switch 250, and take-away feed rollers 36, 38 continue the forward feed of the letter toward trip finger 28 of the feeding and printing unit 20. Since only switch 250 has been closed, feed rollers 32 and 38 continue to be driven. As forward feeding of the letter continues, the leading edge of this letter moves against trip finger 28 until this trip finger reaches the tripped, letter-stopping position as shown in FIG. 22. As trip finger 28 pivots from the position of FIG. 20 to the tripped, letter stopping position of FIG. 21, lever 302 moves the distal end of link 300 against actuating member 282 of switch 252 to close the latter. Accordingly, with the parts in the positions shown in FIG. 21, both of switches 250 and 252 have been closed to energize solenoid 190 whereupon the drive to separator feed roller 32 and take-away feed roller 38 of unit 22 is stopped with the letter at the stopped position in registry with drum 24 and printing die 29. This drive is stopped abruptly but not instantaneously when solenoid 190 is energized so that the above-described adjusting screw 278 (FIGS. 13, 14 and 16) must be set to accommodate the slight time lapse between energization of the solenoid and complete stopping of this drive. It will also be noted that with the parts in the positions shown in FIG. 21, feeding and printing drum 24 has started its one-revolution cycle of operation. As drum 24 rotates it comes into driving engagement with the letter L, and the drum 24 and printing die 29, in cooperation with impression roller 26, print an impression on and forwardly feed the letter to move trip finger 28 forwardly to a fully advanced position as depicted in FIG. 22. Trip finger 28 will have been released just prior to this forward feeding of the letter by drum 24 and impression roller 26 (except when comparatively thick letters are being operated upon, as described above). With the parts in the position of FIG. 22, both of switches 250 and 252 are closed so that feed rollers 32 and 38 of unit 22 remain stopped. As drum 24 and impression roller 26 feed the letter forwardly, feed rollers 32 and 38 of unit 22 are permitted to rotate in the clockwise direction by virtue of the over-riding feature of clutches 144 and 146. Both of switches 250 and 252 remain closed, and the drive to feed rollers 32 and 38 consequently remains stopped until the trailing end of the letter L clears trip finger 260 as shown in FIG. 23 whereupon the trip finger 260 returns to its initial, non-tripped position. Switch 250 is thereby opened whereby solenoid 190 is de-energized to start the drive to feed rollers 32 and 38 of the unit 22. The next lowermost letter of the stack will therefore be pre-fed to a ready position as indicated in FIG. 24 while the preceding letter continues to be fed throughout the one-cycle operation of the drum 24 in cooperation with continuously rotating impression roller 26, all as shown in FIG. 24. The ready or pre-fed position of said next letter is determined by the point at which trip finger 260 effects closing of switch 250; it being noted that switch 252 is still closed. As soon as the trailing end of the preceding letter clears trip finger 28 and the latter returns to the position of FIG. 25 to open switch 252, the drive to feed rollers 32 and 38 starts again. Feed rollers 32 and 38 then feed the letter up to the stopping position as shown in FIG. 21, and the above-described cycle of operation goes on to repeat itself.

It is to be noted that not only does the above-described arrangement accommodate the single cycle feed and letter-stopping features of the unit 20 but, in addition, provides for improved efficiency by pre-feeding each letter before the preceding letter has cleared the feeding and printing drum 24 while preventing each letter from being fed against a preceding letter which has temporarily been stopped at the registered position.

Since many changes can be made in the embodiment of the invention as particularly described and shown herein without departing from the scope of the invention, it is intended that this embodiment be considered as exemplary and that the invention not be limited except as warranted by the following claims.

What is claimed is:

1. An automatic feeding apparatus comprising: a single cycle feeding unit and a supply feeding unit; said single cycle feeding unit including first means for feeding documents forwardly from a first feeding location, and means operatively connected for driving said first feeding means throughout a single document-feeding cycle each time a document is supplied to said first feeding location; said supply feeding unit including second means for feeding documents forwardly in one-by-one succession from a second feeding location to said first feeding location, and means operatively connected, when actuated, for continuously driving said second feeding means; said first and second feeding locations being spaced apart a distance less than the length of the documents being fed; and control means operatively connected for de-actuating said last-named driving means when and so long as the condition prevails that a portion of one of said documents is disposed at each of said feeding locations.

2. An automatic feeding apparatus comprising: a single cycle feeding unit and a supply feeding unit; said single cycle feeding unit including a first pair of feed rollers for feeding documents forwardly therefrom, and means operatively connected for driving said first pair of feed rollers throughout a single document-feeding cycle each time a document is supplied thereto; said supply feeding unit including a second pair of feed rollers for feeding documents forwardly in one-by-one succession therefrom to said first pair of feed rollers, separator means for separating documents from a stack and delivering the separated documents in one-by-one succession to said second pair of feed rollers, and means operatively connected, when actuated, for continuously driving said separator means and said second pair of feed rollers; said first and second pairs of feed rollers being spaced apart a distance less than the length of the documents being fed; and control means operatively connected for de-actuating said last-named driving means when and so long as the condition prevails that a portion of one of said documents is disposed at each of said pairs of feed rollers.

3. An automatic feeding apparatus comprising: a single cycle feeding unit and a supply feeding unit; said single cycle feeding unit including first means for feeding documents forwardly from a first feeding location, and means operatively connected for driving said first feeding means throughout a single document-feeding cycle each time a document is supplied to said first feeding location; said supply feeding unit including second means for feeding documents forwardly in one-by-one succession from a second feeding location to said first feeding location, and means operatively connected, when actuated, for continuously driving said second feeding means; said supply feeding unit further including over-riding means permitting forward withdrawal of a document from said second feeding location while said last-named driving means is de-actuated; said first and second feeding locations being spaced apart a distance less than the length of the documents being fed; and control means for said last-named driving means; said control means comprising a first sensing member located to detect the presence of a document at said first feeding location, a second sensing member located to sense the presence of a document at said second feeding location; and means operatively arranged to de-actuate said last-named driving means when and so long as both of said sensing members detect the presence of a document at their respective feeding locations.

4. In combination: a letter supply feeding unit and a rotary postage printing and letter feeding unit; said letter supply feeding unit including means, when energized, for feeding letters in one-by-one succession from a stack to move the leading edge of each fed letter from a stacked position past a pre-fed position to a letter stop position; said letter supply feeding unit further including a first trip finger movable by the leading edge of each fed letter from an initial position to said pre-fed position; a first electrical switch operatively arranged to be actuated when said first trip finger moves from said initial position to said pre-fed position; said postage printing and feeding unit including a second trip finger movable by the leading edge of each fed letter from an initial position to said letter stop position; said postage printing and feeding unit further including means for releasing said second trip finger from said letter stop position and for printing a postage stamp impression on each letter fed thereto and feeding that letter forwardly from said letter stop position; a second electrical switch operatively arranged to be actuated when said second trip finger moves from its initial position to said letter stop position; and means operatively connected to de-energize said first-named means only when both of said switches are actuated.

5. In combination: a letter supply feeding unit and a postage printing and letter feeding unit; said postage printing and letter feeding unit including a trip finger having an initial position, a letter stop position and a fully advanced position; said trip finger, when in said initial position and said letter stop position, being disposed in the feed path of the letters and, when in said fully advanced position, being disposed out of said feed path; means operatively connected to effect a postage printing and feeding cycle each time said trip finger is moved by a fed letter from said initial position to said letter stop position; means to release said trip finger for movement by the fed letter from said letter stop position to said fully advanced position; and means operatively connected to return said trip finger from said fully advanced position to said initial position each time a fed letter clears the trip finger; said letter supply feeding unit including means for feeding letters in one-by-one sequence to move the leading edge of each letter from a stacked position, past a pre-fed position, past said initial position and then to said letter stop position; and means for interrupting the feed of each letter when the leading edge thereof reaches said pre-fed position until said trip finger next returns from said fully advanced position to said initial position.

6. A single cycle device for forwardly feeding and printing postage on letters in one-by-one succession, said device including a rotary printing and feeding drum adapted to forwardly feed comparatively thick letters substantially earlier in each cycle than that at which comparatively thin letters are forwardly fed, a trip finger mounted for movement from an initial position to a fully advanced position, a stop normally disposed to obstruct movement of said trip finger at a stop position intermediate said initial position and said fully advanced position, means operatively connected to effect a postage printing and feeding cycle each time said trip finger is moved by a letter from said initial position to said stop position, means operatively arranged to move said stop from obstructing relation to said trip finger to release the trip finger just before forward feeding of each comparatively thin letter occurs, and yieldable means interposed between said trip finger and said stop to permit forward movement of said trip finger from said stop position before release of the trip finger occurs when the respective letter being fed is comparatively thick.

7. In combination: a letter supply feeding unit and a postage printing and letter feeding unit; said postage printing and letter feeding unit including a rotary printing and feeding drum adapted to forwardly feed comparatively thick letters substantially earlier in each cycle than that at which comparatively thin letters are forwardly fed; a trip finger mounted for movement from an initial position to a fully advanced position; a stop normally disposed to obstruct movement of said trip finger at a stop position intermediate said initial position and said fully advanced position; means operatively connected to effect a postage printing and feeding cycle each time said trip finger is moved by a letter from said initial position to said stop position; means operatively arranged to move said stop from obstructing relation to said trip finger to release the trip finger just before forward feeding of each comparatively thin letter occurs; yieldable means interposed between said trip finger and said stop to permit forward movement of said trip finger from said stop position toward said fully advanced position before release of the trip finger occurs when the respective letter being fed is comparatively thick; means operatively connected to return said trip finger from said fully advanced position to said initial position each time a fed letter clears the trip finger; said letter supply feeding unit including means for feeding letters in one-by-one sequence to move the leading edge of each letter from a stacked position, past a pre-fed position, past said initial position and then to said stop position; and means operatively arranged to interrupt the feed of each letter when the leading edge thereof reaches said pre-fed position until said trip finger next returns from said fully advanced position to said initial position.

8. An automatic feeding and printing apparatus comprising: a first unit for printing an impression at a registered position on each one of a plurality of successive documents and for feeding each of said successive documents forwardly, and a second unit for separating documents from a stack and for feeding said documents in one-by-one succession to said first unit; said first unit including a printing roller and an opposed impression roller for printing an inmpression on and forwardly feeding each document fed thereto, and means operatively connected, upon each actuation thereof, for driving said printing roller and impression roller throughout a single document-printing and feeding cycle; said second unit including a pair of opposed feed rollers for feeding articles forwardly in one-by-one succession therefrom to said printing roller and impression roller, separator means for separating said documents from a stack and feeding said documents in one-by-one succession to said pair of feed rollers, and means operatively connected, while actuated, for continuously driving said separator means and said second pair of feed rollers; a stop member disposed in the feed path of the documents for forward movement by each fed document to a stop position at which said stop retains each respective document in registry with said printing roller; means operatively connected to actuate said first-named driving means when said stop member is moved to said stop position; said first-named driving means being operatively connected to release said stop member for forward movement past the stop position by the time the printing roller and impression roller begin feeding the respective document; a trip member disposed adjacent said pair of opposed feed rollers and in the feed path of the documents for forward movement by each successive document to a tripped position; and control means operatively connected for de-actuating said last-named driving means when and so long as said trip member is in tripped position and said stop member is in said stop position or therepast.

9. An automatic feeding and printing apparatus comprising: a first unit for printing an impression at a registered position on each one of a plurality of successive documents and for feeding each of said successive documents forwardly, and a second unit for separating documents from a stack and for feeding said documents in one-by-one succession to said first unit; said first unit including a printing roller and an opposed impression roller for printing an impression on and forwardly feeding each document fed thereto, and means operatively connected, upon each actuation thereof, for driving said printing roller and impression roller throughout a single document-printing and feeding cycle; said second unit including means for separating documents from a stack and feeding the documents forwardly in one-by-one succession to said printing roller and impression roller, and means operatively connected, while actuated, for continuously driving said separating and feeding means; said last-named means including an overriding clutch permitting forward withdrawal of a document from said separating and feeding means while said last-named driving means is de-actuated; said separating and feeding means being spaced from said printing and feeding means a distance less than the length of the documents being fed; a stop member disposed in the feed path of the documents for forward movement by each fed document to a stop position at which said stop retains each respective document in registry with said printing roller; means operatively connected to actuate said first-named driving means when said stop member is moved to said stop position; said first-named driving means being operatively connected to release said stop member for forward movement past the stop position by the time the printing roller and impression roller begin feeding the respective document; a trip member disposed adjacent said separating and feeding means and in the feed path of the documents for forward movement by each successive document to a tripped position; and control means operatively connected for de-actuating said last-named driving means when and so long as said trip member is in tripped position and said stop member is in said stop position or therepast.

References Cited in the file of this patent
UNITED STATES PATENTS

| | | |
|---|---|---|
| 1,478,464 | Waters | Dec. 25, 1923 |
| 2,130,898 | Ogden | Sept. 20, 1938 |
| 2,406,040 | Ryan et al. | Aug. 20, 1946 |
| 2,883,929 | Eichenbaum et al. | Apr. 28, 1959 |